US011813574B2

(12) United States Patent
Strikovski et al.

(10) Patent No.: US 11,813,574 B2
(45) Date of Patent: Nov. 14, 2023

(54) SUBSEA SEAWATER FILTRATION APPARATUS

(71) Applicant: FMC Technologies, Inc., Houston, TX (US)

(72) Inventors: Andrei Strikovski, Spring, TX (US); Janardhan Davalath, Spring, TX (US); Abhishek Shah, Cypress, TX (US); Loreen Ople Villacorte, Velp (NL); Paul Verbeek, Voorhout (NL); Thomas Krebs, Doorwerth (NL)

( * ) Notice: Subject to any disclaimer, the term of this patent is extended or adjusted under 35 U.S.C. 154(b) by 0 days.

(21) Appl. No.: 17/723,287

(22) Filed: Apr. 18, 2022

(65) Prior Publication Data

US 2023/0098796 A1 Mar. 30, 2023

Related U.S. Application Data

(63) Continuation of application No. 16/619,072, filed as application No. PCT/US2017/038752 on Jun. 22, 2017, now abandoned.

(51) Int. Cl.
*B01D 61/02* (2006.01)
*B01D 63/06* (2006.01)
(Continued)

(52) U.S. Cl.
CPC ........... *B01D 63/06* (2013.01); *B01D 61/026* (2022.08); *B01D 61/027* (2013.01); *B01D 61/08* (2013.01);
(Continued)

(58) Field of Classification Search
CPC .... B01D 61/08; B01D 63/06; B01D 2313/04; B01D 2313/105; B01D 2319/04; C02F 2103/08
See application file for complete search history.

(56) References Cited

U.S. PATENT DOCUMENTS 3,695,446 A * 10/1972 Lyall ...................... B01D 63/10
210/438
4,187,179 A * 2/1980 Harms ................... B01D 29/66
210/243
(Continued)

*Primary Examiner* — Bradley R Spies
(74) *Attorney, Agent, or Firm* — Henry C. Query, Jr.

(57) ABSTRACT

A filtration apparatus includes a tubular casing having a longitudinal axis and first and second casing ends, a plurality of partition plates positioned in the casing and sealed thereto to thereby define a plurality of axially successive chambers within the casing, including an intake collection chamber between a first of the partition plates and the first casing end, a discharge collection chamber between a second of the partition plates and the second casing end, and a reject collection chamber opposite the second partition plate from the second casing end. A plurality of elongated filtration membrane stacks are positioned side-by-side in the casing generally parallel to the longitudinal axis. Each filtration membrane stack includes an intake end which is fluidly connected to the intake collection chamber, a discharge end which is fluidly connected to the reject collection chamber, and a permeate channel which extends between the intake and discharge ends and is fluidly connected to the discharge collection chamber, an end of the permeate channel located adjacent the intake end being sealed from the intake collection chamber. The filtration apparatus also includes an intake pipe having a first end fluidly connected to the intake collection chamber and a second end fluidly connected to a first connector located proximate the second casing end; a discharge pipe having a first end fluidly connected to the discharge collection chamber and a second end fluidly connected to a second connector located proximate the first connector; and a reject pipe having a first end fluidly connected to the reject collection chamber and a second end fluidly connected to a third connector located proximate the first and second connectors. Each filtration membrane stack includes a plurality of filtration membranes, and the plurality (Continued)

of filtration membrane stacks together define a plurality of axially successive sets of radially adjacent filtration membranes. Also, each filtration membrane of each of the sets of filtration membranes is sealed to a corresponding hole in a respective one of the partition plates.

13 Claims, 6 Drawing Sheets

(51) Int. Cl.
*C02F 103/08* (2006.01)
*B01D 61/08* (2006.01)
*B01D 65/02* (2006.01)
*B01D 65/08* (2006.01)
*C02F 1/44* (2023.01)
*C02F 1/76* (2023.01)

(52) U.S. Cl.
CPC ............ *B01D 65/02* (2013.01); *B01D 65/08* (2013.01); *C02F 1/442* (2013.01); *C02F 1/76* (2013.01); *B01D 2311/12* (2013.01); *B01D 2311/2649* (2013.01); *B01D 2313/04* (2013.01); *B01D 2313/08* (2013.01); *B01D 2313/18* (2013.01); *B01D 2313/20* (2013.01); *B01D 2319/025* (2013.01); *B01D 2319/04* (2013.01); *B01D 2321/08* (2013.01); *B01D 2321/168* (2013.01); *C02F 2103/08* (2013.01); *C02F 2303/16* (2013.01); *C02F 2303/20* (2013.01)

(56) References Cited

U.S. PATENT DOCUMENTS

2007/0272628 A1* 11/2007 Mickols ............... B01D 61/027
    210/336
2015/0053083 A1* 2/2015 Taylor .................. B01D 63/04
    96/6

* cited by examiner

SUBSEA SEAWATER FILTRATION APPARATUS

The present application is a continuation of U.S. patent application Ser. No. 16/619,072 filed on Dec. 3, 2019, which is a U.S. national stage filing of International Patent Application No. PCT/US2017/038752 filed on Jun. 2, 2017.

The present disclosure relates to a seawater filtration apparatus which comprises multiple filtration membrane stacks. In one embodiment, the disclosure is directed to a seawater filtration apparatus which comprises multiple filtration membrane stacks positioned in a single vertical casing through which the intake, reject and discharge pipes are also routed. The present disclosure is also directed to an improved filtration membrane and a filtration system which comprises such a membrane.

BACKGROUND OF THE INVENTION

Filtration assemblies are commonly used in the subsea hydrocarbon production industry to filter certain minerals from raw seawater prior to injecting the seawater into the hydrocarbon formation for artificial lift applications. Such filtration assemblies are typically located topside (i.e., on a production vessel or platform) and usually include multiple filtration membrane stacks which are each housed in a corresponding horizontally oriented casings. Large numbers of the horizontal casings, e.g., up to sixty or more, are stacked together in a supporting frame, and the individual casings in each stack are connected to a common collector by an external piping assembly. In this arrangement, the large stacks of horizontally oriented casings and the external piping assembly required to connect the casings to the collector contribute to a filtration assembly which is relatively complex and heavy and comprises a relatively large footprint. Consequently, such filtration system are impractical for use subsea.

Large footprint/weight requirements and high operating costs associated with intervention, cleaning and replacement are currently the key limiting factors to the use of nanofiltration (NF) membranes in seawater filtration systems, especially in offshore (both topside and subsea) facilities. As shown in the prior art seawater treatment system depicted in FIG. 4, the seawater treatment process typically involves pre-treatment, nano-filtration and post-treatment (e.g., de-aeration) systems. The pre-treatment system usually comprises a coarse filter (e.g., screen filter, strainer) followed by a granular media filter or a low pressure-driven membrane such as a microfiltration (MF) or ultrafiltration (UF) membrane. A biocide solution, typically chlorine containing an oxidizing solution, is injected into the pre-treatment system or into the effluent of the pre-treatment system to control the growth of microorganisms in the NF system. NF membranes such as those with a polyamide active layer often degrade when exposed to greater than 0.1 ppm of chlorine, and any residual chlorine should therefore be deactivated by injecting a chemical chlorine scavenger or passing the liquid through activated carbon before feeding the pretreated water to the NF system. The NF system comprises a number of uncoated membrane elements installed in multiple arrays of one or two stages. Typical water recovery of the NF system is 50% for a single stage and 75% for two stages. The NF system occupies around 50% of the overall footprint of the water filtration system.

A majority of NF membrane elements currently employed in water filtration systems installed in oil and gas fields comprise polyamide thin film composite membranes packaged in a spiral wound configuration. These membranes have the tendency to suffer from severe fouling due to the accumulation of particulate/colloidal, organic and/or biological matter, resulting in reduced water productivity and/or high operational costs (e.g., for chemical cleaning or replacement). When performance is reduced to below the pre-defined criteria (e.g., normalized permeate flow, salt passage or pressure drop), the filtration system (or a part of the system) is taken offline and cleaning-in-place (CIP) is performed with a suite of chemicals from the chemical cleaning system. An example of one such cleaning procedure is described in "Dow Filmtec™ Membranes—Cleaning Procedures for DOW FILMTEC FT30 Elements" published by the DOW Chemical Company. The combination of reduced membrane permeability, frequent downtime and high chemical consumption due to fouling translates directly to lower productivity and high operational expenditures (OPEX). Successful implementation of a filtration system in remote offshore topsides or even subsea facilities is largely dependent on the logistics of chemicals.

Therefore, a need exists for a reduced weight, small footprint water filtration system and/or a NF membrane which exhibits enhanced permeability, selectivity, chlorine tolerance and protection from foulant accumulation.

SUMMARY OF THE INVENTION

In accordance with the present disclosure, a filtration apparatus is provided which comprises a tubular casing having a longitudinal axis and first and second ends, a plurality of elongated filtration membrane stacks positioned side-by-side in the casing generally parallel to the longitudinal axis, and a plurality of partition plates positioned in the casing and preferably sealed thereto to thereby define an intake collection chamber between a first of the partition plates and the first end, a discharge collection chamber between a second of the partition plates and the second end, and a reject collection chamber opposite the second partition plate from the second end.

In accordance with one embodiment, the filtration apparatus also includes an intake pipe which is fluidly connected to the intake collection chamber, a discharge pipe which is fluidly connected to the discharge collection chamber and a reject pipe which is fluidly connected to the reject collection chamber. The intake, discharge and reject pipes may be a single multibore connector which is configured to couple to a corresponding multibore connector hub which is located, e.g., below the second end of the casing when the filtration apparatus is oriented vertically. This arrangement substantially reduces the footprint of the filtration apparatus and facilitates the installation and retrieval of the apparatus from a surface vessel.

In accordance with another embodiment, each filtration membrane stack comprises a number of filtration membranes, each of which is sealed to a corresponding hole in a corresponding partition plate. Each filtration membrane comprises an inlet end and an outlet end, and the outlet end is spaced apart from an adjacent partition plate located closer to the second end. Thus, the reject fluid from each filtration membrane is allowed to flow into the chamber formed by the two partition plates before entering the inlet end of the succeeding filtration membranes. As a result, if one filtration membrane should become clogged, that filtration membrane will not clog the entire filtration membrane stack.

The present disclosure is also directed to a membrane-based water filtration system for removing sulfates and other multi-valent ions from a liquid, including but not limited to seawater, groundwater, produced water, or a mixture thereof. The improved NF membrane disclosed herein uses a special coating to enhance the separation efficiency by increasing flux, providing better selectivity and increased rejection, reducing fouling, and increasing tolerance to chemical cleaning. The improved NF membrane is particularly useful for removing sulfates from water sources for the purpose of water injection, such as in improved oil recovery (IOR) or enhanced oil recovery (EOR) operations. In such applications, the improved water quality results in additional recovery from the reservoir, avoidance of scale in the reservoir and facilities, avoidance of souring due to the proliferation of sulfate-reducing bacteria (SRB's), and better efficiency of the EOR chemicals.

The water filtration system comprising the improved NF membrane of the present disclosure is also a superior alternative to existing sulfate removal systems installed in onshore and offshore facilities and facilitates installation of a subsea water injection facility. The NF membrane is suitable for new build systems and for retrofitting existing sulfate removal units (SRU). The application of water treatment systems incorporating the improved NF membrane will significantly increase the applicability of such systems on the basis of water quantity/quality, footprint/weight requirements, chemical use and operability, and marketability in the oil and gas industry.

The water filtration system of the present disclosure includes at least one NF membrane element which is modified with a super-hydrophilic coating that can improve NF permeability by at least 25%, as well as improve foulant repulsion capability and chlorine tolerance, without compromising, and possibly even improving, sulfate rejection. The coated NF membrane significantly lowers chemical consumption (thus reducing chemical storage footprint) and frequency of cleaning intervention. The coating is applicable to various commercially available membranes of different geometry and materials. In addition, a re-coating system is designed to be put into operation (if necessary) when the efficacy of the initial coating degrades due to exposure to fouling or cleaning chemicals. The re-coating operation can be implemented after conventional chemical cleaning is applied. The recoating rig is fully integrated into the chemical cleaning system, thus requiring minimal additional footprint and a simple adjustment to the conventional chemical cleaning rig. The reduction in chemical consumption due to the reduction in cleaning frequency and the elimination of the need for a de-chlorination step can compensate for the additional footprint allotted for recoating chemicals.

The disclosed water filtration system involves passing the water through an improved nano-filtration ("NF") membrane having, preferably, at least 25% higher permeability than the prior art, thus enabling applicability and ease of deployment for both topside and subsea sulfate removal units. These improvements are suitable for designing new NF systems and for retrofitting existing systems to improve productivity. The resulting NF systems require less footprint, which enables their application on space and weight constrained platforms.

These and other objects and advantages of the present disclosure will be made apparent from the following detailed description, with reference to the accompanying drawings. In the drawings, the same reference numbers may be used to denote similar components in the various embodiments.

DETAILED DESCRIPTION

A general embodiment of the filtration apparatus of the present disclosure comprises a tubular casing comprising a longitudinal axis and first and second ends, a plurality of elongated filtration membrane stacks positioned side-by-side in the casing generally parallel to the longitudinal axis, and a plurality of partition plates positioned in the casing and preferably sealed thereto to thereby define an intake collection chamber between a first of the partition plates and the first end, a discharge collection chamber between a second of the partition plates and the second end, and a reject collection chamber opposite the second partition plate from the second end. Each filtration membrane stack comprises an intake end which is fluidly connected to the intake collection chamber, a discharge end which is fluidly connected to the reject collection chamber, and a permeate channel which extends between the first and second ends and is fluidly connected to the discharge collection chamber.

In one embodiment, the filtration apparatus also includes an intake pipe having a first end which is fluidly connected to the intake collection chamber and a second end which is fluidly connected to a first connector located proximate the second end, a discharge pipe having a first end which is fluidly connected to the discharge collection chamber and a second end which is fluidly connected to a second connector located proximate the first connector, and a reject pipe having a first end which is fluidly connected to the reject collection chamber and a second end which is fluidly connected to a third connector located proximate the first and second connectors. The first through third connectors can be separate connectors or a single multibore connector which is configured to couple to a corresponding multibore connector hub. This arrangement substantially reduces the footprint of the filtration apparatus and facilitates the installation and retrieval of the apparatus from a surface vessel.

In accordance with an alternative embodiment, each filtration membrane stack comprises a number of filtration membranes, each of which is sealed to a corresponding hole in a corresponding partition plate. Each filtration membrane comprises an inlet end and an outlet end, and the outlet end is spaced apart from an adjacent partition plate located closer to the second end. Thus, the reject fluid from each filtration membrane is allowed to flow into the chamber formed by the two partition plates before entering the inlet end of the succeeding filtration membranes. As a result, if one filtration membrane should become clogged, that filtration membrane will not clog the entire filtration membrane stack.

Figure 1:
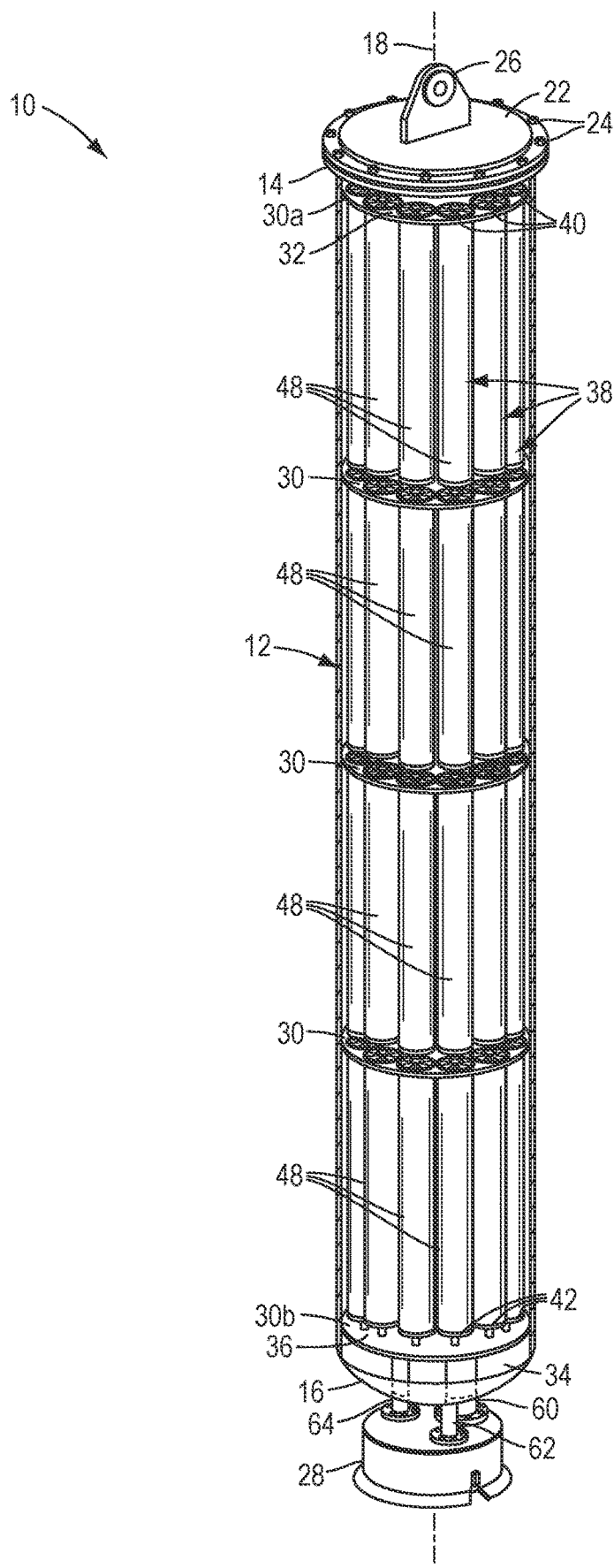
FIG. 1 is a front elevation view of one embodiment of the filtration apparatus of the present disclosure.
Figure 2:
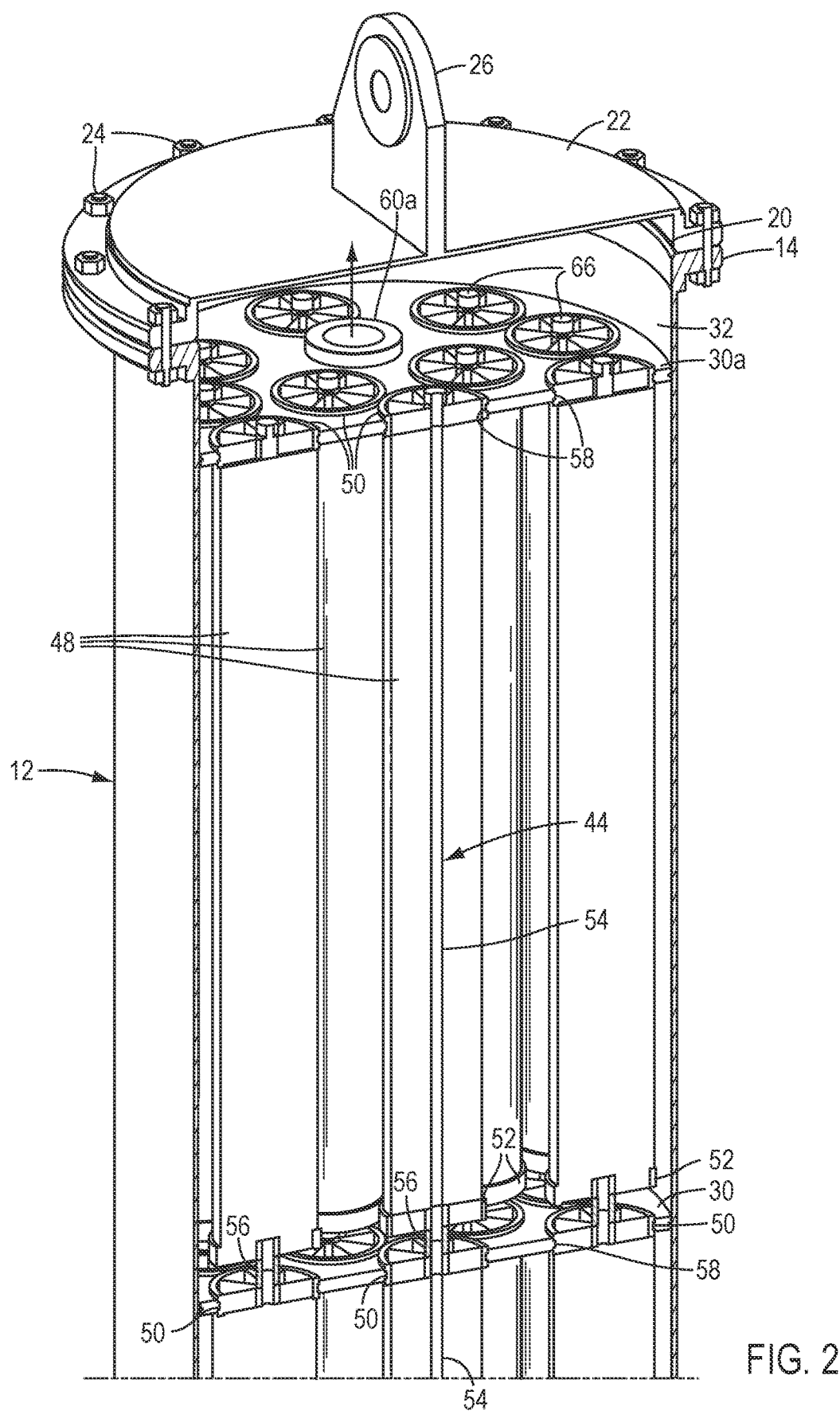
FIG. 2 is an enlarged cross sectional view of the upper end portion of the filtration apparatus shown in FIG. 1.
Figure 3:
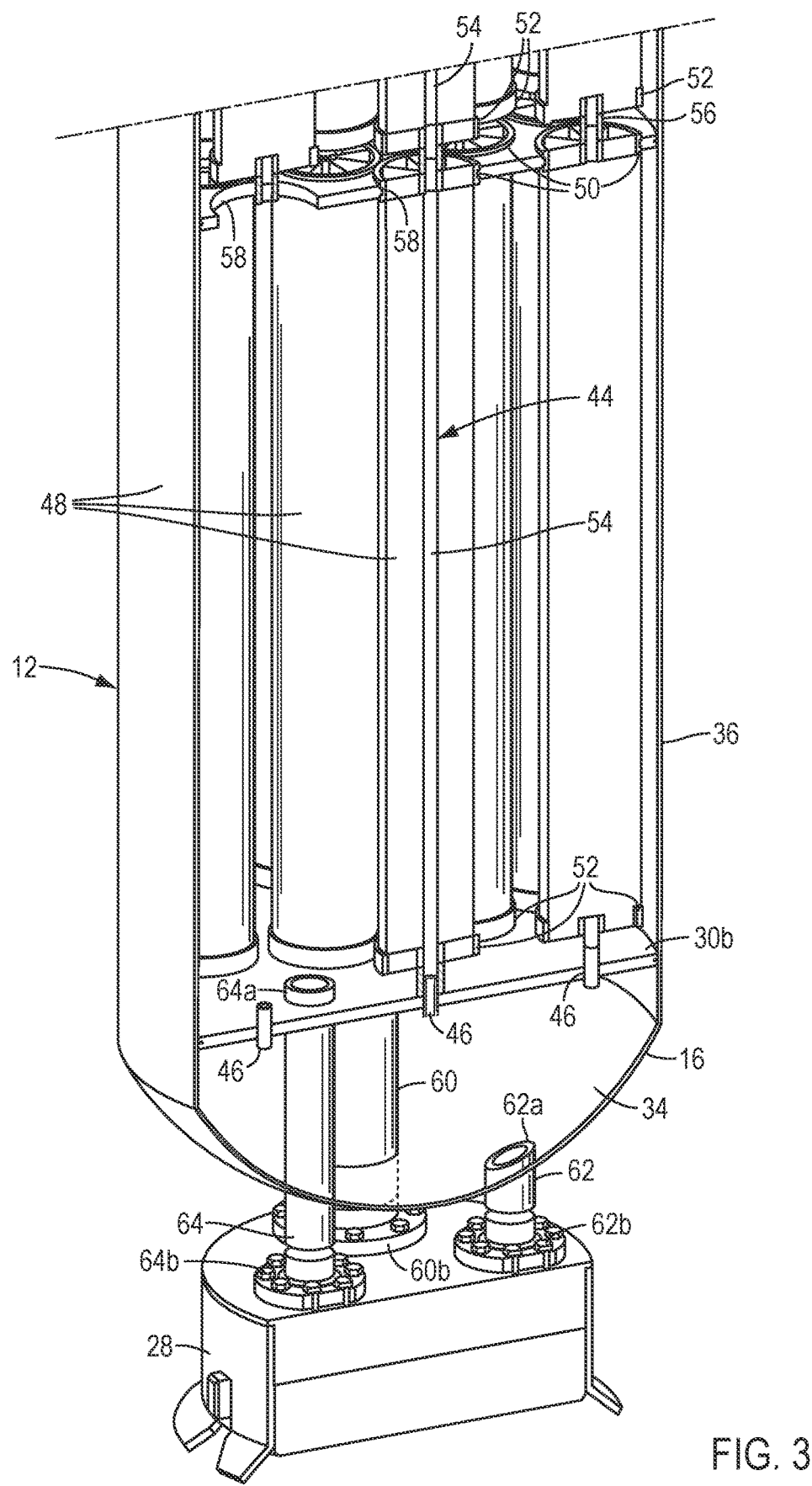
FIG. 3 is an enlarged cross sectional view of the lower end portion of the filtration apparatus shown in FIG. 1.

An particular embodiment of the filtration apparatus of the present disclosure is shown in FIGS. 1-3. The filtration apparatus, generally 10, includes a tubular casing 12 which comprises a first end 14, a second end 16 and a longitudinal axis 18. As shown in FIG. 1, the casing 12 may be oriented generally vertically with the first end 14 positioned over the second end 16. The first end 14 may include an opening 20 which is closed and sealed by a cover 22. The cover 22 may be removably connected to the casing 12 by, e.g., a number of bolts 24. An upstanding eye bracket 26 may be connected to or formed integrally with the cover 22 to enable the filtration module 10 to be installed and retrieved from a surface vessel (not shown). As will be discussed in more detail below, the filtration apparatus 10 may also include a multibore connector hub 28 which is positioned proximate the second end 16 of the casing 12.

A plurality of spaced-apart transverse partition plates 30 are positioned within and preferably also sealed to the casing 12 to thereby divide the interior of the casing into a plurality of longitudinally spaced chambers, including an intake collection chamber 32 which is located between a first partition plate 30a and the first end 14 of the casing 12, a discharge collection chamber 34 which is located between a second partition plate 30b and the second end 16 of the casing, and a reject collection chamber 36 which is located opposite the second partition plate from the discharge collection chamber. Each partition plate 30 may be sealed to the casing 12 by, e.g., a suitable ring seal (not shown) positioned between the circumferential edge of the partition plate and the inner surface of the casing. Alternatively, each partition plate 30 may be sealed to the casing 12 by being press fit, welded or otherwise attached to the casing. In the example shown in FIGS. 1-3, the filtration apparatus 10 comprises five partition plates 30. However, the filtration apparatus 10 may comprise two or more partition plates 30, two being the minimum number required to define the intake collection chamber 32, the discharge collection chamber 34 and the reject collection chamber 36 (which with only two partition plates would be defined between the first partition plate 30a and the second partition plate 30b).

A plurality of filtration membrane stacks 38 are positioned side-by-side in the casing 12 generally parallel to the longitudinal axis 18. Each filtration membrane stack 38 comprises an intake end 40 which is fluidly connected to the intake collection chamber 32, a discharge end 42 which is fluidly connected to the reject collection chamber 36 and a permeate channel 44 (FIGS. 2-3) which extends axially between the intake and discharge ends and is fluidly connected to the discharge collection chamber 34. In the embodiment of the filtration apparatus 10 shown in FIGS. 1-3, for example, the intake end 40 of each filtration membrane stack 38 is sealed to a corresponding hole in the first partition plate 30a, the discharge end 42 of each filtration membrane stack is located in the reject collection chamber 36, and the permeate channel 44 of each filtration membrane stack is fluidly connected to the discharge collection chamber 34 by a corresponding discharge tube 46 (FIG. 3).

Each filtration membrane stack 38 is comprised of a number of filtration membranes 48. The number of filtration membranes 48 in each filtration membrane stack 38 will depend on the particular application for which the filtration apparatus 10 is designed. In certain applications, each filtration membrane stack 38 may be comprised of a single filtration membrane 48. In other applications, each filtration membrane stack may comprise two or more axially aligned filtration membranes 48. In the embodiment shown in FIG. 1, for example, each filtration membrane stack 38 comprises four axially aligned filtration membranes 48.

As seen best in FIGS. 2 and 3, each filtration membrane 48 comprises an inlet end 50, an outlet end 52 and a permeate passage 54 which extends axially between the inlet and outlet ends. In one embodiment of the filtration apparatus 10, each filtration membrane 48 may comprise a cross flow filtration membrane. An example of a cross flow filtration membrane which is suitable for use in the filtration apparatus 10 is a DOW FILMTEC™ filtration membrane sold by the Dow Chemical Company. In operation, a fluid to be filtered enters the filtration membrane 48 through the inlet end 50 and is separated into a reject fluid which is discharged through the outlet end 52 and a permeate fluid which is discharged through the permeate passage 54. Where each filtration membrane stack 38 comprises a single filtration membrane 48, the inlet and outlet ends 50, 52 of the filtration membrane define the intake and discharge ends 40, 42 of the filtration membrane stack, and the permeate passage 54 defines the permeate channel 44. Where each filtration membrane stack 38 comprises two or more filtration membranes 48, the inlet end 50 of the filtration membrane 48 closest to the first end 14 of the casing 12 defines the intake end 40 of the filtration membrane stack, the outlet end 52 of the filtration membrane closest to the second end 16 of the casing defines the discharge end 42 of the filtration membrane stack, and the permeate passages 54 of the several filtration membranes are connected together by suitable means, such as tubular connectors 56, to thereby define the permeate channel 44 through the filtration membrane stack.

Each filtration membrane 48 is positioned and preferably also sealed in a corresponding hole 58 in a respective partition plate 30. In this manner, the chambers defined by the partition plates 30 will ideally be fluidly isolated from each other. The filtration membranes 48 may be sealed to their respective holes 58 by any appropriate means, such as with a suitable ring seal (not shown) or by being press fit into the hole or welded or otherwise attached to the partition plate 30. Also, the filtration membranes 48 may be positioned within their respective holes 58 such that any portion of the filtration membrane from the inlet end 50 to the outlet end 52 engages the hole. In the embodiment shown in FIGS. 1-3, for example, the filtration membranes 48 are positioned such that the inlet ends 50 engage the holes 58. When each filtration membrane 48 is positioned in its respective partition plate 30 as just described, the inlet end 50 of the filtration membrane is fluidly connected to a chamber located on the side of partition plate which faces the first end 14 of the casing 12, and the outlet end 52 of the filtration membrane is fluidly connected to a chamber located on the side of the partition plate which faces the second end 16 of the casing. Thus, each filtration membrane 48 forms a conduit between the successive chambers through which the fluid to be filtered is directed.

In accordance with a non-limiting embodiment of the filtration apparatus 10, the outlet end 52 of each filtration membrane 48 is positioned in a chamber which is formed between the partition plate 30 in which the filtration membrane is positioned and the next partition plate closer to the second end 16 of the casing 12. In other words, the outlet end 52 of each filtration membrane 48 is axially spaced apart from the next partition plate 30 closer to the second end 16. As a consequence of this arrangement, the reject fluids which exit the outlet ends 52 of each set of radially aligned filtration membranes 48 are allowed to commingle within the chamber before entering the inlet ends 50 of the next set of radially aligned filtration membranes. In contrast to an arrangement in which the outlet end of each filtration membrane feeds directly into the inlet end of the next filtration membrane, allowing the reject fluids to flow through the chamber ensures that a single clogged filtration membrane will not render the entire filtration membrane stack 38 inoperable. Thus, a single clogged filtration membrane 48 will have minimal effect of the efficiency of the whole filtration apparatus 10.

Referring specifically to FIGS. 2 and 3, the filtration apparatus 10 also includes an intake pipe 60 having a first end 60a which is connected to the intake collection chamber 32 (FIG. 2), a discharge pipe 62 having a first end 62a which is connected to the discharge collection chamber 34, and a reject pipe 64 having a first end 64a which is connected to the reject collection chamber 36. The intake pipe 60, the discharge pipe 62 and the reject pipe 64 also comprise respective second ends 60b, 62b, 64b which as shown in FIG. 3 may be positioned adjacent each other proximate the second end 16 of the casing 12, for example below the second end of the casing when the filtration apparatus 10 is oriented vertically. This arrangement will facilitate connecting the second ends 60b, 62b, 64b to corresponding fluid conduits of a separate subsea apparatus (not shown) when the filtration apparatus 10 is installed using, e.g., an ROV or a wireline. The intake pipe 60 and the reject pipe 64 may be configured to extend to their respective chambers on the outside of the casing 12 or, as shown in FIGS. 2 and 3, they may extend axially through the interior of the casing and through corresponding holes in the partition plates 30.

The second ends 60b, 62b, 64b of the pipes 60, 62, 64 may be connected to separate fluid connectors (not shown) which are configured to releasably couple to corresponding fluid connectors on the subsea apparatus or, as shown in FIGS. 1 and 3, the second ends may be connected to a single multibore connector, such as the connector 28, which is configured to releasably couple to a corresponding multibore connector hub on the subsea apparatus. The multibore connector 28 is preferably remotely connectable and disconnectable from the separate apparatus to allow for easy installation and retrieval of the filtration apparatus 10 from a surface vessel.

In operation of the filtration apparatus 10, a fluid to be filtered, such as raw seawater, is conveyed under pressure through the intake pipe 60 to the intake collection chamber 32. The seawater enters the inlet ends 50 of the first set of radially aligned filtration membranes 48, which function to filter certain minerals from the water. The filtered water migrates to the permeate passages 54 in the filtration membranes 48 and is conveyed through the permeate conduits 44 to the discharge collection chamber 34. The ends of the permeate passages 54 adjacent the intake collection chamber 32 are sealed by plugs 66 to prevent raw seawater from entering the permeate passages in this first set of filtration membranes 48. From the discharge collection chamber 34, the permeate is discharged to the separate subsea apparatus through the discharge pipe 60.

At the same time, the unfiltered water, or reject fluid, flows through the outlet ends 52 of the filtration membranes 48, into the chamber formed between the first partition plate 30a and the succeeding partition plate, and into the inlet ends 50 of the next set of radially aligned filtration membranes 48 (or into the reject collection chamber 36 if each filtration membrane stack 38 comprises a single filtration membrane). The filtration process is then repeated in this and each succeeding set of radially aligned filtration membranes 48 until the reject fluid is expelled through the outlet ends 52 of the final set of filtration membranes into the reject collection chamber 36. From the reject collection chamber 36, the reject fluid is discharged to the separate subsea apparatus through the reject pipe 64.

The present disclosure is also directed to improved filtration membranes, specifically nano-filtration (NF) and reverse osmosis membranes, and a water filtration system which incorporates such membranes. In one embodiment, the filtration membrane is modified by application of one or more layers of a coating, each layer of which is ultra-thin, e.g., less than 20 nm, and highly negatively charged and/or super-hydrophilic. The coating layers provide an optimal balance between hydrophilicity and negative charge density, enabling the modified membrane to exhibit significantly higher water productivity while maintaining or increasing membrane selectivity towards sulfates and other multivalent anions. The coating layers also provide substantial protection for the membrane from chlorine oxidation and bacterial adhesion.

The chemistry and method of application of the membrane coating are described in U.S. patent application Ser. No. 15/630,792 (now U.S. Pat. No. 10,646,829) by Teledyne Scientific & Imaging, LLC entitled High Flux, Chlorine Resistant Coating for Sulfate Removal Membranes, which was filed on Jun. 22, 2017 and is hereby incorporated herein by reference. The coating is comprised of a material which renders the active top layer of the membrane hydrophilic. In one embodiment, the coating may be comprised of two layers applied sequentially. The first layer, which is applied to the active top layer of the membrane, may be a thin, conformal hydrophilic layer composed of a combination of a hydrophilic polymer and a surfactant. The combination of the hydrophilic polymer and surfactant results in an ultrathin but conformal coating which substantially increases the permeability of the membrane. However, this coating may suppress the surface charges of the membrane, which in turn may reduce its sulfate rejection. This effect may be reduced by attaching highly negatively charged molecules in the form of, e.g., a negatively charged material, to the thin first layer of coating to increase the negative charge density at the surface. This results in a second layer with high sulfate rejection which does not affect the permeability of the membrane. The negatively charged molecules can be dyes with sulfonate, carboxyl and other negatively charged groups.

Such a coating has been found to increase the permeability of NF membranes by greater than 25% without compromising their initial sulfate removal efficiency. The base uncoated membrane can be made of a polyamide, polyethersulfone or cellulose acetate material. The membrane can comprise spirally wound flat sheets, hollow-fibers, capillary or tubular membranes packaged in cylindrical elements.

In accordance with a more specific embodiment, the coating may comprise a conformal chlorine-resistant, fouling-resistant and permeate-flux-enhancing coating which is comprised of a hydrophilic polymer, a surfactant and a charged compound containing one or more sulfonate functionalities and one or more linkable functionalities such as amine, monochlorotriazine or dichlorotriazine. In this embodiment, the hydrophilic polymer may comprise one or more of the following materials: polydopamine, polyethylene, polyvinyl alcohol, hydroethyl cellulose, hydroxyl propyl cellulose, methyl cellose poly(hydroxyethyl methacrylate) and its copolymers, styrene-maleic anhydride copolymer, methyl vinyl ether-maleic anhydride copolymer, polyethylenimine, carboxy methyl cellulose, locust bean gum, bean gum, carrageenan, agar, polyvinylpyrrolidone, sulfonate polysulfone, polyethylene oxide and copolymers, polyethylene glycol, polyacrylamide, and polysaccharide.

The surfactant may comprise at least one hydrocarbon chain having at least 16 carbon atoms. More specifically, the surfactant may comprise at least one hydrocarbon chain having 16 to 24 carbon atoms. For example, the surfactant may comprise N-erucyl-N,N-bis(2-hydroxyethyl)-N-methyl ammonium chloride. Alternatively, the surfactant may comprise one or more of the following materials: sodium lauryl sulfate, sodium laureth sulfate, sodium lactate, tetrazolides, phospholipids capable of assuming a zwitterionic state, cocamidopropyl betaine, sulfobetaines and polyethylene glycol.

Prior to being applied to the filtration membrane, the coating may comprise a solution having greater than 10 wt % of surfactant. The coating may then be applied to a thickness of less than or equal to 20 nm, more preferably to less than or equal to 5 nm.

The present disclosure is also directed to a method for applying a conformal chlorine-resistant, fouling-resistant and permeate-flux-enhancing coating on a filtration membrane. In accordance with one embodiment, the method involves communicating a first composition comprising a hydrophilic polymer and a surfactant to the surface of the membrane. The membrane is then exposed to a saline solution, after which the saline is removed from the membrane, for example by rinsing the surface of the membrane. Then, a second composition comprising an oxidant dissolved in a buffered solution adjusted to a pH between 5 and 11 is communicated to the surface of the membrane, after which the membrane is again rinsed. A third compound is then communicated to the surface of the membrane. In this step, the third compound is a charged compound containing one or more sulfonate functionalities and one or more linkable functionalities such as amine, monochlorotriazine or dichlorotriazine, and this compound is dissolved in a buffered solution adjusted to a pH between 7 and 11. After the step of applying the third compound to the first surface, the membrane is once again rinsed.

Figure 4:
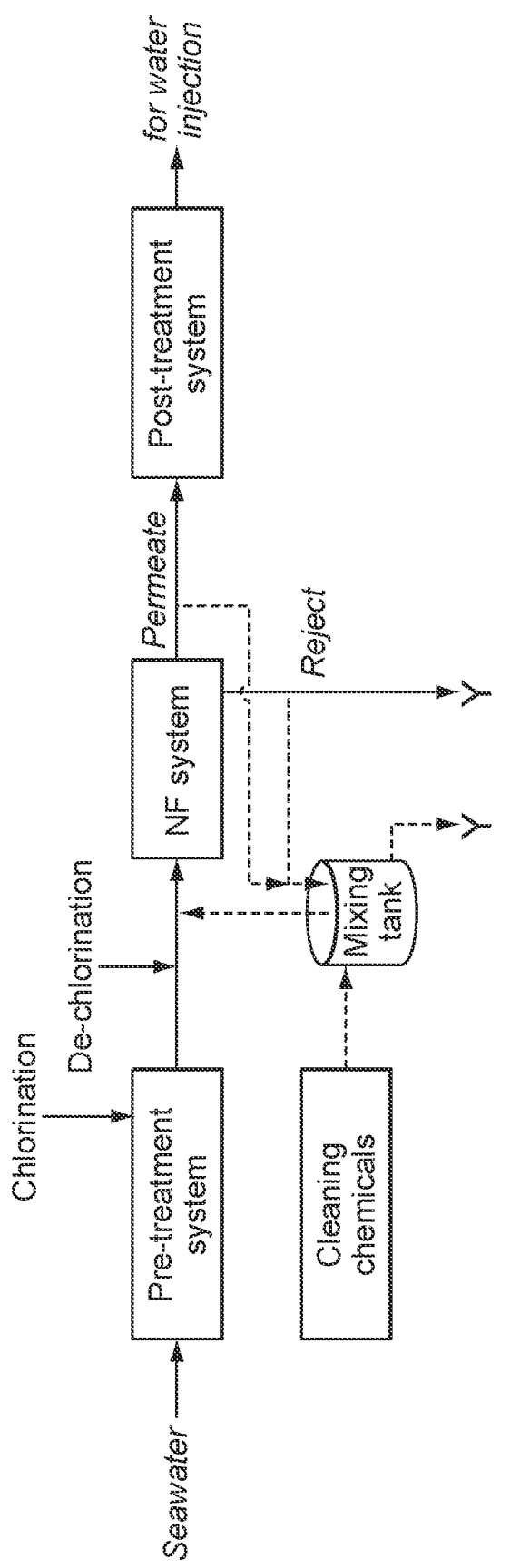
FIG. 4 is a schematic representation of a prior art nano-filtration system.

Polyamide filtration membranes, which are currently used in a majority of oil and gas field applications, have very low chlorine tolerance (<1000 ppm-hr) and therefore require a de-chlorination step to prevent degradation of the membranes (see FIG. 4). In contrast, the modified filtration membranes of the present disclosure allow the introduction of a biocide to the water, typically chlorine, which can be generated in-situ or ex-situ and injected in the pre-treatment system or the effluent of the pre-treatment system to control the growth of microorganisms in the downstream filtration system. This is due to the fact that the coated membrane has a significantly higher chlorine tolerance, e.g., greater than 5000 ppm-hr, compared to the prior art. As a result, periodic shock dose injections of chlorine, in addition to a continuous low dose injection of chlorine to suppress any bio-activity, can be undertaken without the need for a chlorine scavenger upstream of the filtration system. In addition, since the injected chlorine is not neutralized before entering the coated membranes, it will serve as both a sterilizing and a cleaning agent, thus minimizing the frequency of chemical cleaning. This in combination with the elimination of a chlorine scavenger application will significantly reduce the chemical requirements and hence the chemical cost and storage footprint of the filtration system. In addition, the inventors have found that as an alternative to the use of cleaning chemicals, fouling may be removed from the coated filtration membrane using a warm water wash.

Figure 5:
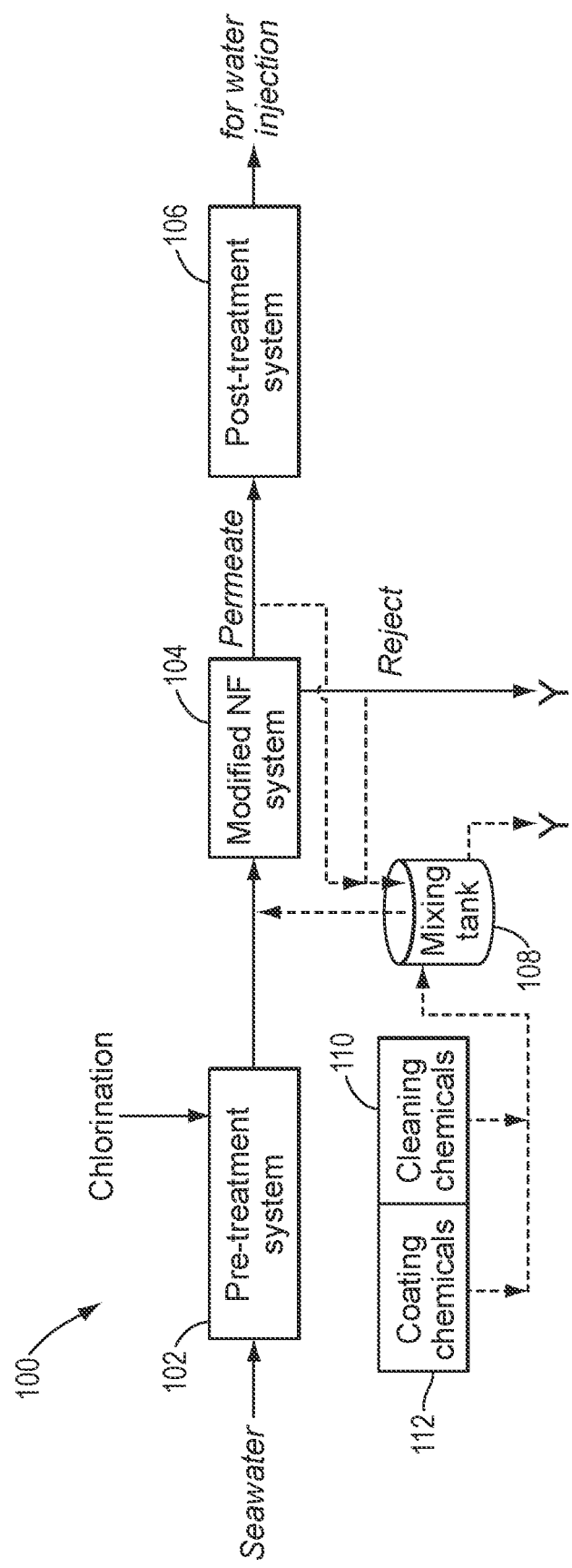
FIG. 5 is a schematic representation of a first embodiment of the nano-filtration system of the present disclosure.

One example of a water filtration system which incorporates an improved NF membrane of the present disclosure is shown in FIG. 5. Similar to the prior art embodiment shown in FIG. 4, the water filtration system of this embodiment, generally 100, includes a pre-treatment stage 102, a NF stage 104 and a post-treatment stage 106. In this example, seawater enters the pre-treatment stage 102, where it is subject to a coarse filtering through, e.g., a screen filter or strainer, possibly followed by a finer filtering through, for instance, a granular media filter or a microfiltration (MF) or ultrafiltration (UF) membrane. As shown in FIG. 5, the seawater may also be subject to chlorination at the pre-treatment stage 102, for example by being injected with a biocide solution, such as chlorine containing an oxidizing solution. After the pre-treatment stage 102, the seawater is directed through the NF stage 104, where it is separated into a permeate fluid and a reject fluid (which is sometimes referred to as a concentrate). As an example, the NF stage 104 may comprise a filtration apparatus similar to the filtration apparatus 10 described above, which includes an inlet for the seawater, a permeate outlet for the permeate and a reject outlet for the reject (i.e., the concentrate). The permeate fluid from the NF stage 104 is then directed to the post-treatment stage 106, where it is subject to the conventional treatments, such as de-aeration.

For cleaning operations, a portion of the permeate fluid from the NF stage 104 is fed into a mixing tank 108, where it is mixed with one or more cleaning chemicals 110. This mixture is then injected into the seawater upstream of the NF stage 104 in order to clean the NF membranes. The cleaning chemicals are then flushed from the NF system using, e.g., permeate. If required, the NF membranes may be re-coated with coating chemicals 112 in a manner which will be described below in connection with FIG. 6. The composition of the coating chemicals may be as described above.

Figure 6:
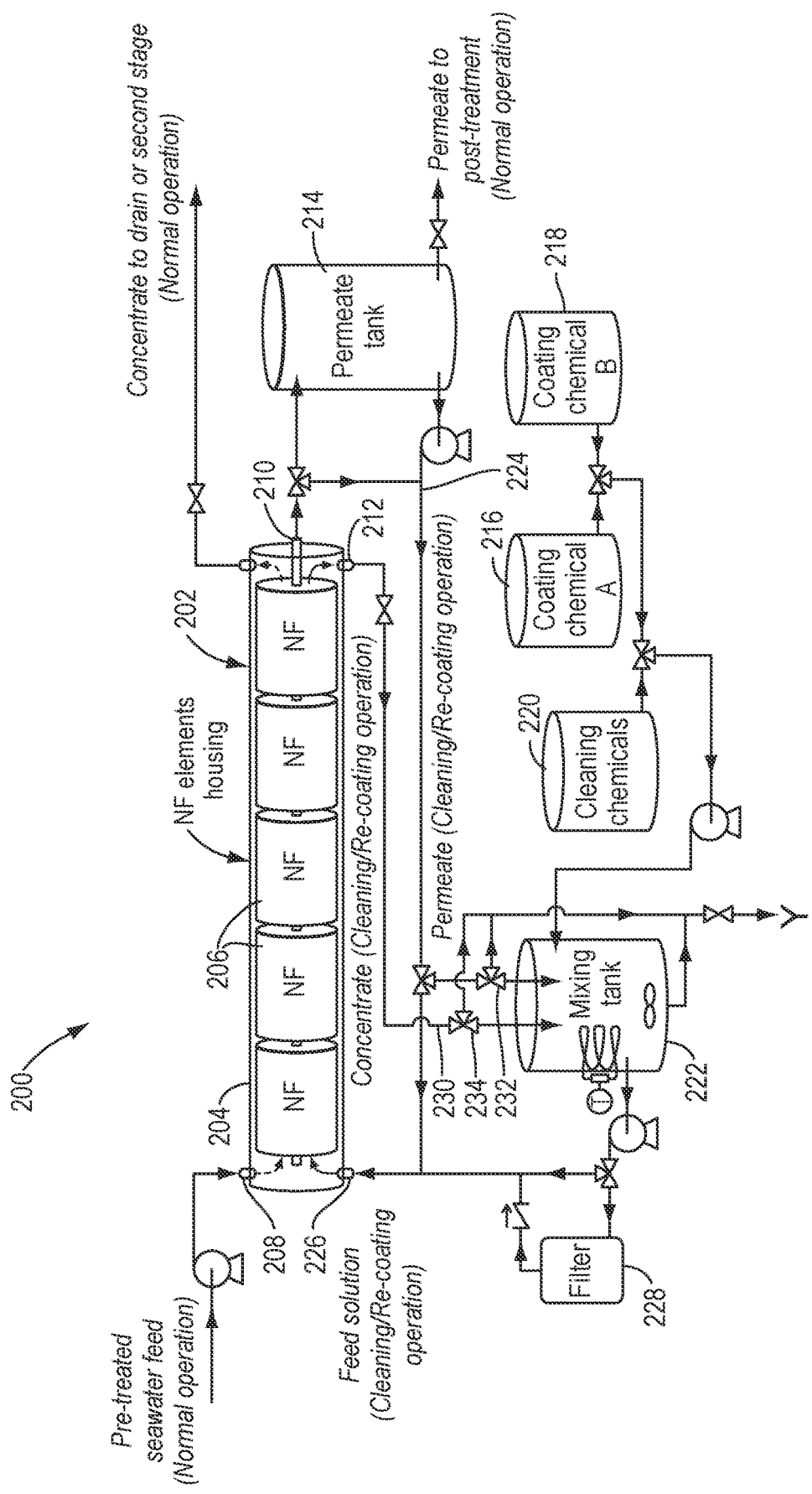
FIG. 6 is a schematic representation of a second embodiment of the nano-filtration system of the present disclosure.

Another example of a water filtration system which incorporates an improved NF membrane of the present disclosure is shown in FIG. 6. The filtration system of this embodiment, generally 200, includes a NF filtration apparatus 202 comprising a casing or housing 204 within which a number of NF membranes 206 are positioned. It should be noted that the NF apparatus 202 is depicted generally, and that the actual apparatus may comprise a plurality of housings which each house one or more NF membranes. Alternatively, the NF apparatus 202 may be similar to the filtration apparatus 10 described above. In this example, the housing 204 is shown to comprise a seawater inlet 208, a permeate outlet 210, and a reject outlet 212. In operation, seawater from a pre-treatment stage (not shown) is communicated under pressure through the inlet 208 and into the housing 204, where it is separated into a reject fluid which is discharged through the reject outlet 212 and an NF permeate fluid which is discharged through the permeate outlet 210. The NF permeate fluid may then be directed to a permeate tank 214 or conveyed directly to a post-treatment stage (not shown).

In this embodiment, the conventional chemical cleaning line has been modified to enable introduction of one or more coating chemicals from tanks 216, 218 into the housing 204 for in-situ periodic replenishment of the coating layer(s) of the NF membranes 206, if necessary. When the effectiveness of the initial coating is significantly reduced based on operational performance (e.g., permeability and solute rejection), the coating regime may be put into effect. A segment of the NF system, which may comprise a single or multiple arrays of housings which each contain a number, such as one to eight, of NF membranes 206, is isolated and taken out of normal operation. Conventional chemical cleaning is then performed using cleaning chemicals from a tank 220 in a manner described for example in the Dow Filmtec™ fact sheet referenced above, followed by a re-coating regime.

The re-coating regime may involve, e.g., dilution in a mixing tank 222 of concentrated coating chemicals from the tanks 216, 218 with de-mineralized water or NF permeate until the desired chemical condition is satisfied. For this purpose, either the permeate tank 214 or the permeate outlet 210, or both, may be connected to the mixing tank 222 through a permeate line 224. The coating solution is then pumped into the housing 204 through a service inlet 226 until all the liquid remaining from the chemical cleaning regime has been drained out. If the coating solution contains particulate components, it may be diverted through a filter 228 (e.g., a cartridge filter, MF/UF membrane, etc.) before being fed to the housing 204. Then, the concentrate and NF permeate are diverted back to the mixing tank 222 through a concentrate line 230, which is connected between the reject outlet 212 and the mixing tank, until a steady state is reached, followed by soaking for period of time consistent with the coating protocol of the specific type of coating chemical. The same regime is repeated when multiple steps of coating are to be applied. The NF system may then be flushed with NF permeate from the permeate tank 214 until all residual coating solution is drained out of the system. Finally, the re-coated array of NF membranes 206 is put back into normal operation. The coating regime may be further implemented for the remaining segments of the NF system, if necessary. The filtration system 200 may include a number of valves for selectively connecting either the permeate line 224 or the concentrate line 230 to the mixing tank, such as a first valve 232 which is positioned in the permeate line and a second valve 234 which is positioned in the concentrate line.

Although the embodiments shown in FIGS. 5 and 6 have been described in connection with filtration apparatuses comprising NF membranes, the filtration apparatuses could instead comprise reverse osmosis membranes.

In accordance with another embodiment of the filtration apparatus, the membrane coating is designed such that the rejection of di-valent sulfate ions is not compromised compared to an uncoated NF membrane. The coating is therefore particularly suited for desulfation membranes which are commonly used in Sulfate Removal Units (SRU) that are employed in seawater injection systems to mitigate the risk of souring the reservoir and the risk of plugging the formation due to deposition of sulfate-based scale.

In accordance with another embodiment of the present disclosure, the pre-treatment stage 102 (FIG. 5) may comprise a number of sand-coated media filters which are configured to remove bacteria and suspended solids from the feed seawater stream in order to meet the required silt density index for nanofiltration.

It should be apparent from the above description that the any of the filtration apparatuses disclosed herein can be used in a subsea environment. As a result, the filtration apparatuses are particularly suitable for use in injection wells. Locating the filtration apparatus on the seabed allows the treated seawater to be injected straight into the injection well without the use of conventional topside equipment. In addition, the filtration apparatus disclosed herein may be used on the sea floor as a supplementary treatment to the basic treatment regime in which solids/fines and bacteria are removed from the seawater.

It should be recognized that, while the present disclosure has been presented with reference to certain embodiments, those skilled in the art may develop a wide variation of structural and operational details without departing from the principles of the disclosure. For example, the various elements shown in the different embodiments may be combined in a manner not illustrated above. Therefore, the following claims are to be construed to cover all equivalents falling within the true scope and spirit of the disclosure.

What is claimed is:

1. A filtration apparatus which comprises:
a tubular casing which includes a longitudinal axis and first and second casing ends;
a plurality of partition plates which are positioned in the casing and are sealed thereto to thereby define a plurality of axially successive chambers within the casing, including an intake collection chamber between a first of said partition plates and the first casing end, a discharge collection chamber between a second of said partition plates and the second casing end, and a reject collection chamber opposite the second partition plate from the second casing end;
a plurality of elongated filtration membrane stacks which are positioned side-by-side in the casing generally parallel to the longitudinal axis, each filtration membrane stack comprising an intake end which is fluidly connected to the intake collection chamber, a discharge end which is fluidly connected to the reject collection chamber, and a permeate channel which extends between the intake and discharge ends and is fluidly connected to the discharge collection chamber, wherein an end of the permeate channel located adjacent the intake end is sealed from the intake collection chamber;
an intake pipe which comprises a first end that is fluidly connected to the intake collection chamber and a second end that is fluidly connected to a first connector which is located proximate the second casing end;
a discharge pipe which comprises a first end that is fluidly connected to the discharge collection chamber and a second end that is fluidly connected to a second connector which is located proximate the first connector; and
a reject pipe which comprises a first end that is fluidly connected to the reject collection chamber and a second end that is fluidly connected to a third connector which is located proximate the first and second connectors;
wherein a fluid to be filtered is communicated to the intake collection chamber through the intake pipe and is separated by the filtration membrane stacks into a permeate which is discharged from the discharge collection chamber through the discharge pipe and a reject fluid which is discharged from the reject collection chamber through the reject pipe; and
wherein the first, second and third connectors comprise part of a single multibore subsea connector hub.

2. The filtration apparatus of claim 1, wherein in use the casing is oriented generally vertically with the first casing end located above the second casing end.

3. The filtration apparatus of claim 2, wherein the intake pipe extends axially through the casing from the second casing end to the intake collection chamber.

4. The filtration module of claim 3, wherein the reject pipe extends axially through the casing from the second casing end to the reject collection chamber.

5. The filtration apparatus of claim 1, wherein each filtration membrane stack is sealed in a corresponding hole in the first partition plate.

6. The filtration apparatus of claim 5, wherein each filtration membrane stack comprises a plurality of filtration membranes; wherein said plurality of filtration membrane stacks together define a plurality of axially successive sets of radially adjacent filtration membranes, and wherein each filtration membrane of each of said sets of filtration membranes is sealed to a corresponding hole in a respective one of said partition plates.

7. The filtration apparatus of claim 6, wherein each filtration membrane of each of said sets of filtration membranes comprises:

an inlet end through which the fluid to be filtered enters the filtration membrane;

an outlet end through which the reject fluid exits the filtration membrane; and a permeate passage which extends axially between the inlet end and the outlet end, the permeate passage being isolated from both an upstream chamber located on a side of said respective one of said partition plates facing the first casing end and a downstream chamber located on a side of said respective one of said partition plates facing the second casing end;

wherein the inlet end is open to said upstream chamber; and wherein the outlet end is spaced apart from an adjacent partition plate located closer to the second casing end such that the reject fluid exits the filtration membrane into said downstream chamber.

8. The filtration apparatus of claim 7, wherein each filtration membrane is sealed to the corresponding hole proximate the inlet end.

9. The filtration apparatus of claim 7, wherein the permeate passages of the filtration membranes in each filtration membrane stack are fluidly connected together to thereby form the permeate channel for that filtration membrane stack.

10. The filtration apparatus of claim 9, further comprising a plurality of connector tubes, each of which extends between a corresponding permeate channel and the discharge collection chamber.

11. A filtration apparatus which comprises:

a tubular casing which includes a longitudinal axis and first and second casing ends;

a plurality of partition plates which are positioned in the casing and are sealed thereto to thereby define a plurality of axially successive chambers within the casing, including an intake collection chamber between a first of said partition plates and the first casing end, a discharge collection chamber between a second of said partition plates and the second casing end, a reject collection chamber opposite the second partition plate from the second casing end, and at least one intermediate chamber located between the intake collection chamber and the reject collection chamber;

a plurality of elongated filtration membrane stacks which are positioned side-by-side in the casing generally parallel to the longitudinal axis, each filtration membrane stack comprising an intake end which is fluidly connected to the intake collection chamber, a discharge end which is fluidly connected to the reject collection chamber, and a permeate channel which extends between the intake and discharge ends and is fluidly connected to the discharge collection chamber, wherein an end of the permeate channel located adjacent the intake end is sealed from the intake collection chamber;

an intake pipe which comprises a first end that is fluidly connected to the intake collection chamber and a second end that is fluidly connected to a first connector which is located proximate the second casing end;

a discharge pipe which comprises a first end that is fluidly connected to the discharge collection chamber and a second end that is fluidly connected to a second connector which is located proximate the first connector; and a reject pipe which comprises a first end that is fluidly connected to the reject collection chamber and a second end that is fluidly connected to a third connector which is located proximate the first and second connectors;

wherein a fluid to be filtered is communicated to the intake collection chamber through the intake pipe and is separated by the filtration membrane stacks into a permeate which is discharged from the discharge collection chamber through the discharge pipe and a reject fluid which is discharged from the reject collection chamber through the reject pipe; and wherein each filtration membrane stack comprises a plurality of filtration membranes, each of which includes an inlet end, an outlet end, and a permeate passage which extends between and is sealed from the inlet and outlet ends, wherein the permeate passages of the filtration membranes in each filtration membrane stack are fluidly connected together to thereby define the permeate channel for said filtration membrane stack;

wherein said plurality of filtration membrane stacks together define a plurality of axially successive sets of radially adjacent filtration membranes;

wherein the filtration membranes of each of said sets of filtration membranes are sealed to corresponding holes in a respective one of said partition plates;

wherein the inlet end of each filtration membrane in each of said sets of filtration membranes is open to a chamber located immediately upstream of its respective partition plate; and wherein the outlet end of each filtration membrane in each of said sets of filtration membranes is open to a chamber located immediately downstream of its respective partition plate.

12. The filtration apparatus of claim 11, wherein each filtration membrane is sealed to the corresponding hole proximate the inlet end.

13. The filtration apparatus of claim 11, wherein said plurality of axially successive sets of radially adjacent filtration membranes includes a first set of filtration membranes whose inlet ends are open to the intake collection chamber, a second set of filtration membranes whose outlet ends are open to the reject collection chamber, and at least one intermediate set of filtration membranes located between the first and second sets of filtration membranes.

* * * * *